US010798199B2

(12) United States Patent
Chandrayana et al.

(10) Patent No.: US 10,798,199 B2
(45) Date of Patent: Oct. 6, 2020

(54) NETWORK TRAFFIC ACCELERATOR

(71) Applicant: Twin Prime, Inc., San Francisco, CA (US)

(72) Inventors: Kartikeya Chandrayana, San Francisco, CA (US); Satish Raghunath, Sunnyvale, CA (US); Radha Krishna Pagadala, Sunnyvale, CA (US); Shauli Gal, Mountain View, CA (US); Maria Garcia Cerdeno, San Jose, CA (US); Russell Larsen, Santa Clara, CA (US)

(73) Assignee: Twin Prime, Inc., Redwood City, CA (US)

( * ) Notice: Subject to any disclaimer, the term of this patent is extended or adjusted under 35 U.S.C. 154(b) by 24 days.

(21) Appl. No.: 15/872,971

(22) Filed: Jan. 16, 2018

(65) Prior Publication Data

US 2018/0159947 A1 Jun. 7, 2018

Related U.S. Application Data

(63) Continuation of application No. 14/970,510, filed on Dec. 15, 2015, now Pat. No. 9,871,878.

(60) Provisional application No. 62/092,209, filed on Dec. 15, 2014.

(51) Int. Cl.
*H04L 29/08* (2006.01)
*H04L 29/06* (2006.01)
*H04L 12/26* (2006.01)

(52) U.S. Cl.
CPC .............. *H04L 67/28* (2013.01); *H04L 67/02* (2013.01); *H04L 69/16* (2013.01); *H04L 43/0835* (2013.01); *H04L 43/0852* (2013.01)

(58) Field of Classification Search
CPC .......... H04L 67/28; H04L 67/02; H04L 69/16
See application file for complete search history.

(56) References Cited

U.S. PATENT DOCUMENTS

| 6,389,460 | B1 | 5/2002 | Stewart et al. |
| 6,510,469 | B1 | 1/2003 | Starnes et al. |
| 6,892,235 | B1 | 5/2005 | Daude et al. |
| 8,018,866 | B1 | 9/2011 | Kasturi et al. |
| 9,037,638 | B1 | 5/2015 | Lepeska et al. |

(Continued)

OTHER PUBLICATIONS

U.S. Appl. No. 14/970,510, Non-Final Office Action dated May 15, 2017.

(Continued)

*Primary Examiner* — Ricky Q Ngo
*Assistant Examiner* — Stephen N Steiner
(74) *Attorney, Agent, or Firm* — Wong & Rees LLP; Kirk D. Wong

(57) ABSTRACT

A system for improving network data communications performance between end-user devices and content origin servers. A plurality of accelerators are distributed across a network and communicate with end-user devices and content origin servers. Software development kits installed on end-user devices monitor control channel data traffic between the end-user devices and accelerators. Various data traffic efficiency approaches are implemented by the software development kits on the end-user devices and the plurality of accelerators resulting in improved data communications links between the end-user devices and the content origin servers.

20 Claims, 4 Drawing Sheets

(56) References Cited

U.S. PATENT DOCUMENTS

| | | | |
|---|---|---|---|
| 9,871,878 B2 | 1/2018 | Chandrayana et al. | |
| 2003/0065762 A1* | 4/2003 | Stolorz | H04L 29/06 |
| | | | 709/223 |
| 2008/0228920 A1* | 9/2008 | Souders | H04L 67/2842 |
| | | | 709/226 |
| 2009/0287968 A1* | 11/2009 | Lee | G06Q 20/10 |
| | | | 714/699 |
| 2013/0073609 A1 | 3/2013 | Connolly et al. | |
| 2014/0204950 A1 | 7/2014 | Willars et al. | |
| 2014/0337472 A1* | 11/2014 | Newton | H04L 67/32 |
| | | | 709/217 |
| 2015/0100664 A1* | 4/2015 | Flack | H04L 67/28 |
| | | | 709/213 |
| 2015/0248337 A1 | 9/2015 | Adler | |
| 2016/0173387 A1 | 6/2016 | Chandrayana et al. | |

OTHER PUBLICATIONS

U.S. Appl. No. 14/970,510, Notice of Allowance dated Sep. 14, 2017.

* cited by examiner

NETWORK TRAFFIC ACCELERATOR

PRIORITY CLAIM

This application claims benefit as a Continuation of U.S. application Ser. No. 14/970,510, filed Dec. 15, 2015, which claims benefit of U.S. Provisional Application Ser. No. 62/092,209, filed on Dec. 15, 2014, the entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to network communications, and in particular, to acceleration of network traffic.

BACKGROUND

In order to accelerate network traffic, it may be necessary to download all data through a proxy so that certain optimizations may be deployed at the proxy. Given the diversity in content, it quickly becomes unsustainable to expect the proxy to have an understanding of the nature of the content in order to apply optimizations. Sometimes this is due to new protocols and formats becoming popular, sometimes it is the cost of terminating connections such as with encrypted data. For example, to accelerate HTTPS traffic the service provider may not want to terminate the connection and decrypt the content, but instead may wish to operate in a content agnostic manner.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1:
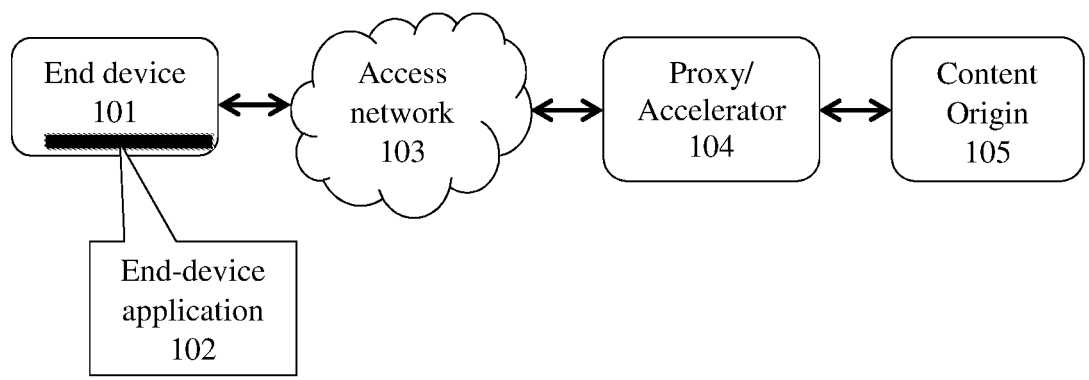
FIG. 1 illustrates a block diagram of an end user device communicating with a content origin via a proxy/accelerator, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. ENHANCEMENTS TO TRADITIONAL TRANSPORT LAYERS FOR IMPROVED PERFORMANCE
   2.1. EFFICIENT MECHANISM FOR RETRIEVING CONTENT THROUGH A PROXY
      2.1.1 ADVANTAGES
   2.2. RECEIVE WINDOW LIMITS
      2.2.1 LIMITATIONS
      2.2.2 SOLUTIONS
   2.3. MITIGATING NOISE OR LOSSES IN TCP ACKNOWLEDGEMENTS
      2.3.1 PROBLEM
      2.3.2 SOLUTION
3. BUNDLED TRANSPORT LAYER: A NEW TRANSPORT MECHANISM
   3.1. PROBLEMS WITH TCP
   3.2. DESIGN OF A BUNDLED TRANSPORT LAYER
   3.3. ADVANTAGES OF BTL
   3.4. UPLOAD OPTIMIZATION WITH BTL
4. AN OVERLAY NETWORK TO DISCOVER A CLOSER PEER TO REACH AN ORIGIN IN A DIFFERENT GEOGRAPHY
   4.1. DISCOVERING THE ACCELERATOR CLOSEST TO A CONTENT ORIGIN
   4.2. MANAGING THE INTER-ACCELERATOR CONNECTION LIFECYCLE
5. ESTIMATING LOSS PROBABILITY WITH TCP TRAFFIC
   5.1. PROBLEM
   5.2. SOLUTION
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

The HTTP standard provides a method called "CONNECT" that supports specifying a proxy such that the proxy does not need to read or interpret the contents of the actual traffic. The end system issues a CONNECT method and specifies the final destination for this HTTP/HTTPS session. The proxy makes a separate connection to the host specified by the CONNECT method and responds with a success notification. Thereon any data sent by the end system is just passed through to the final destination. Any response from the final destination is relayed back to the end system.

The problem with this model is that successful completion of a CONNECT method is a required step for the application traffic to begin. That means that the application waits for an additional round trip time before initiating the actual traffic. This additional latency is a source of inefficiency and reduces the utility of the CONNECT approach.

A set of scenarios that commonly impact performance are listed below. Unique new solutions for tackling these issues are discussed in detail herein. These scenarios include:

When traffic has to be steered through a proxy server and the payload is opaque to the proxy, popular techniques incur a latency penalty.

When there are many TCP stacks, the default behavior may cause the stack to advertise a lower than desirable limit for receive windows.

The data throughput achieved by the transport stack may be adversely impacted when acknowledgements are either lost or delayed.

Various modifications to preferred embodiments and the generic principles and features described herein will be readily apparent to those skilled in the art. Thus, the disclosure is not intended to be limited to the embodiments shown, but is to be accorded the widest scope consistent with the principles and features described herein.

2. Enhancements to Traditional Transport Layers for Improved Performance

2.1 Efficient Mechanism for Retrieving Content Through a Proxy

In an embodiment, to enable the use of the CONNECT style proxy without the added cost of latency, the embodiment removes the lock-step nature of the existing mechanism. By making an optimistic assumption that a proxy is able to successfully relay traffic most of the time, the need to wait for a positive response is eliminated. In its place, error handling is enhanced to deal with the less likely scenario where the proxy in fact fails to perform as expected. However completely eliminating the CONNECT request is sometimes not desirable. On many operating systems, CONNECT is supported by the HTTP stack implementations provided by the OS vendor. Ability to reuse the HTTP stack functionality may sometimes be tied to using CONNECT to achieve proxy based communication. The embodiment allows using CONNECT along with a proprietary mechanism such that the latency penalty is eliminated while still allowing reuse of existing stacks.

Referring to FIG. 1, in an embodiment, the end system component (e.g., a mobile handset software development kit (SDK), etc.) in the end device 101 (e.g., mobile handset, smartphone, tablet, personal computer, network-connected appliance, etc.) and the proxy 104 (e.g., an accelerator, accelerator proxy, accelerator server, content accelerator, proxy server, etc.) establish a channel of communication called the control channel across access network 103. This may be separate from the channel used for actual data traffic.

When the application 102 on the handset makes a request for some arbitrary content to be retrieved by the SDK:

The SDK sends a message over the control channel specifying a mapping between destination port and a host name. The destination port may be selected from a pre-determined pool of ports that is mutually agreed upon between the handset and the accelerator. The ADD command serves the purpose of a CONNECT request except that it is sent on a separate channel. The mapping instructs the accelerator to expect a data channel connection on the specified destination port and that it should relay that traffic to the specified host name The SDK records the destination port specified in the ADD command in a table that maps it to the host name.

The SDK creates a listen socket at an arbitrary port number on the handset. The local host and this port number are specified as the proxy to the OS HTTP stack so that any CONNECT request that is originated by the OS is in fact destined to this local socket.

When the application's request is passed on to the OS stack, a CONNECT is issued. This is received by the SDK created listener on the local host. The SDK accepts the connection, creates a connected socket and responds with a success message immediately. The association between this connection and the accelerator port number specified in mapping Table 1 example may be achieved in one of two ways. One, the listen port on which proxy requests are received may be associated with an accelerator destination port ahead of time. Two, the SDK retrieves the host name from the CONNECT headers and associates the connected socket with the accelerator destination port number from the mapping table specified in Table 1.

TABLE 1

| Sample mapping table | | |
|---|---|---|
| Accelerator IP address | Destination port | Origin name |
| 50.130.209.10 | 31560 | sub1.origin1.com |
| 50.130.209.10 | 31561 | sub2.origin2.com |

The OS then issues the actual request to retrieve application data. This data makes its way to the connected socket that is serviced by the SDK listener.

The application data arrives at the connected socket. The SDK listener retrieves this data and relays it to the accelerator on a connection to the destination port specified in Table 1.

Response data arrives from the accelerator to the SDK. The accelerator port is mapped back to the connected socket using data represented in Table 1. The response data is then relayed back to the application over this connected socket.

2.1.1 Advantages

When an application requests data for a connection with a proxy, the CONNECT latency is virtually eliminated since the response is generated locally almost instantaneously compared to the time it takes to go over the network. Existing facilities for protocol stacks are reused and no details on the nature of the actual application traffic is needed.

2.2 Receive Window Limits

2.2.1 Limitations

TCP sessions advertise a receive window to signify the maximum amount of data that can be received in a round trip time (RTT). On certain systems this value is held to a limit that is much smaller than bandwidth-delay product of the underlying network. Although TCP has built-in mechanisms to grow this value as the session progresses, the growth does not benefit small file transfers.

2.2.2 Solutions

There are several possible solutions to this problem:

Using APIs provided by the operating system to set the receive window to an appropriate value.

Using server side techniques to help the window grow faster.

With server-side techniques, the following are examples of what could achieve an accelerated growth of the receive window:

If the host system advances the window based on packet arrivals, the server can split the packets appropriately to achieve a faster window growth. In this method, the advertised segment size is untouched while the initial window's worth of data is delivered in a greater number of packets. The increased number of packets is determined based on the acceleration goal.

If the host system is known to advance the window by a certain function of the received bytes and other TCP session parameters such as the advertised segment size, the server side could wait an appropriate amount of time to allow the network to drain the initial window's worth of data and pre-transmit some more data in anticipation of the acknowledgements. This is done with care to detect any impending congestion in the network so that appropriate actions can be quickly taken to conform to the "packet conservation principle" of TCP.

2.3 Mitigating Noise or Losses in TCP Acknowledgements 2.3.1 Problem

TCP relies on acknowledgements from the sender to determine how fast to transmit to the recipient. Sometimes the ACKs are either lost in the network or they may be regulated by an entity in the upstream path. In both these cases, TCP may fail to achieve the best possible transmission rates.

2.3.2 Solution

In an embodiment, the end system component (SDK) can establish a control channel connection with the accelerator. This connection may be separate from the ones that receive application data. The following sequence of events describe the embodiment:

1. The application requests an object. The SDK may then place the request on a TCP connection.
2. As data is received the SDK monitors the receive rate and the time delay between successive read events from the operating system stack. The SDK monitors these measurements to detect issues with earlier ACKs sent to the accelerator. If it determines that ACKs may not be reaching the accelerator as expected, it notifies the accelerator via the OOB-ACK (out of band acknowledgement) command on the control channel. In many scenarios the OOB-ACK packet itself may not be impacted by the network characteristics that affect the original ACK stream. The way issues are detected may take several forms:
    a. The SDK may rely on a threshold for the minimum received rate and maximum time delay between successive read events. If either or both thresholds are breached a loss may have occurred.
    b. The SDK may rely on data about past performance as it relates to real-time operating conditions and may arrive at a threshold for minimum received rate and maximum time delay between read events.
3. On receiving the OOB-ACK command, the accelerator reassesses its state variables for the relevant connection:
    a. It may readjust the estimate of the downstream bandwidth and appropriately transmit additional data.
    b. It may trigger early loss detection logic where information from any earlier SACKs may be used to determine the need for targeted retransmissions.
    c. In some scenarios the estimated downstream bandwidth may be such that the sender needs to take an optimistic view of what the receive window limit should be and sends more than the permissible amount of bytes out under the assumption that the end system/network can take that amount.

3 Bundled Transport Layer: A New Transport Mechanism 3.1 Problems with TCP

TCP has several fundamental limitations when there is a lot of variability in the access network and client environment:

Head of line blocking in the presence of losses. In the event of a loss, the TCP stack in the OS kernel holds up bytes corresponding to subsequent sequence numbers until it has all the bytes in the expected order. For the application this manifests as 'head-of-line' blocking.

Limited utility of error correction schemes. This follows from the head of line blocking property. For highly lossy networks, error correction can be a useful strategy. However, unless error correction is implemented in the OS kernel, there is a likelihood that the bytes carrying error correction information may be held up in TCP buffers leaving the application fewer scenarios in which to use this information for recovery.

Limitations of existing windowing mechanisms. TCP performs an optimal bandwidth search for every connection from scratch and it is possible that the achieved bandwidth on a connection is not optimal. Relying solely on a single TCP connection's estimate of the network bandwidth is thus limiting the achievable TCP window size in various scenarios. Some times this is also made worse by bad default parameter settings on endpoint stacks.

3.2 Design of a Bundled Transport Layer

In an embodiment, a new transport layer called Bundled Transport Layer (BTL) is implemented. The embodiment employs multiple TCP protocol compliant connections as a single unit or "bundle." The algorithms associated with BTL are responsible for determining how data is mapped to individual TCP connections. The highlights of the BTL are:

A BTL bundle features more than one BTL connection over which application data may be striped (distributed).

BTL decouples the application layer request from the underlying transport connection. Instead each request is now associated with a BTL that in turn may opt to break up data among constituent connections.

Application object boundaries are tracked within a BTL connection using a framing mechanism (which could be a standards-based framing such as HTTP/2.0, etc.). The framing mechanism has to identify the application request and a sequence number for the byte chunk to help with reassembly.

There may be several strategies to decide on how data gets mapped to BTL connections. One example is to continue mapping all data to a single BTL connection until such a point where a BTL endpoint detects a stalled window (e.g., due to a loss). At that point the BTL endpoint begins mapping subsequent data bytes onto a different BTL connection that may be deemed unaffected by this event. A second example is to equally divide data bytes among multiple BTL connections in order to achieve a larger effective window. The specific striping algorithm picked may be dependent on the optimization goal.

3.3 Advantages of BTL

Mitigating head of line blocking. Since the BTL endpoint may switch to an alternate BTL connection in the event of a stalled window, there is now a way to work around head of line blocking. This is effective in scenarios where the loss probability is such that it is unlikely to affect multiple constituents of a BTL bundle simultaneously. This is also useful in scenarios where the upstream feedback is noisy and causes slow growth in TCP windows—the BTL bundle as a whole may be able to achieve a higher cumulative window.

Faster recovery from losses due to either striping or error correction. One of the BTL connections may be dedicated for error correction information. If the probability of loss is such that not all constituents of a BTL bundle are affected at the same time, this can help recover from losses with nearly zero impact to total download times.

Error correction in the user-space. Irrespective of support for error correction in the kernel TCP stack, BTL allows a user-space implementation of such mechanisms.

Better solutions to receive window limitations. When receive windows are artificially limited by unsuitable default settings, BTL bundle provides a protocol compliant workaround to achieving optimal bandwidth.

3.4 Upload Optimization with BTL

Upload from mobile. The mobile SDK can send data on BTL connections in proportion to the throughput achieved by each of the connections—data would be sent at the rate that has been calculated for the connections.

Receiver Optimizations. The receiving stack can process out of order data from a BTL connection and tie it together with other data from all BTL connections allowing loss latency to be masked or reduced.

Error correction by receiving stack. If FEC is enabled on the BTL connections the receiving stack can reconstruct missing data and reduce latency; this can come at a cost of using increased bandwidth.

4. An Overlay Network to Discover a Closer Peer to Reach an Origin in a Different Geography When the content origin server is in a different geography from the accelerator that is closest to the handset, additional latencies can be incurred in setting up/tearing down the connection between the accelerator 104 and the content origin server 105. This is different from the latencies incurred when they are co-located or in proximity since the latencies have the potential to crowd out any gains added by acceleration on the last mile.

If the content origin can maintain a persistent connection, this cost is incurred only on connection setup and is amortized over several requests. But considering that content origins are optimized to quickly clean out connections, this is not the norm. An embodiment implements a component to manage this geographically spread out persistent connection. The ideal candidate is the accelerator that is closest to the origin since that saves from introducing yet another type of server in the cloud.

The nature of this persistent connection between accelerators may change with the traffic the system is trying to optimize. It could be a long-haul optimized transport (e.g., suitably tuned TCP or UDP variant) with an optional layer on top to manage request pipelining (e.g., WebSockets or SPDY).

Since there are many accelerators distributed across geographies, a set of such connections between them can be termed an overlay network that is dynamically formed according to needs of devices, such as mobile handsets, etc. If there are enough diverse requests, it could end up being a full mesh, or if there is a particular popular origin, it could become a hub and spoke model. But the manifested structure is not pre-determined.

There are two tasks associated with this approach:
 a) Discovering the accelerator closest to a content origin.
 b) Managing the inter-accelerator connection lifecycle between accelerators.

4.1 Discovering the Accelerator Closest to a Content Origin

A correct answer to the question of which accelerator is "closest" to a content origin involves solving a routing problem periodically. A simple metric for proximity is the round-trip latency. A distance vector table can be constructed to accurately reflect which accelerators are closest to the origin in question. Since the origin itself is a moving target, this needs to run periodically for accuracy. Moreover, this is a distributed exercise involving a routing protocol running on each accelerator. While this is feasible, there is a simpler approach if accuracy is traded off for ease of implementation.

Figure 2:
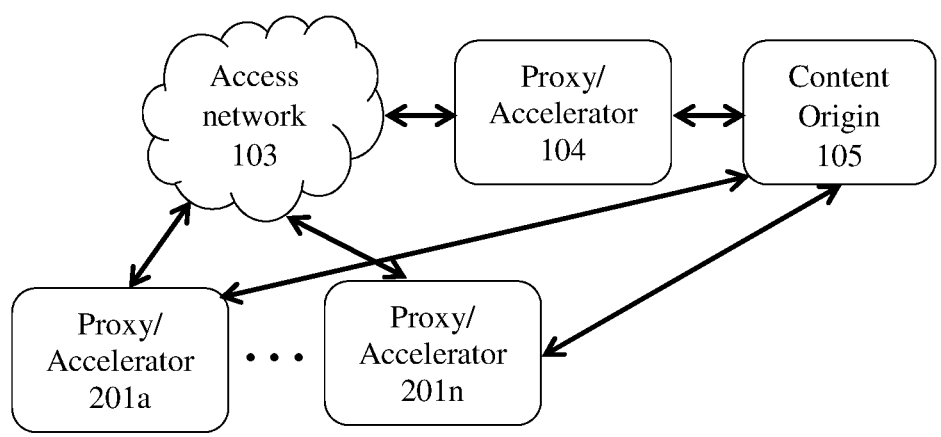
FIG. 2 illustrates a block diagram of peer proxy/accelerators, according to an embodiment of the invention.

Referring to FIG. 2, in an embodiment, a near-stateless and distributed approach would be to arbitrarily select a peer accelerator (e.g., 201*n*) to form the overlay connection. The selection could be completely random or could be an informed guess using geo-IP mapping of the origin IP address. Until the discovery process is deemed to have arrived at an answer, subsequent requests are shuttled to other peer accelerators (e.g., 201*a*). When there is a statistical evidence of one accelerator being closer by way of latency compared to others, the process is temporarily called off.

The mapping to that peer accelerator is then assigned an expiry period. At the end of the expiry period, the discovery starts again. The advantages with the expiry are:
 a) The origin 105 may now be closer to a different accelerator. Given there is some stability to geo-IP mapping, it may not be clear how often this may happen.
 b) If there are no outstanding requests, there is no reason to maintain an active connection.
 c) Changes in accelerator or origin round trip time due to network failure or routing anomaly.

4.2 Managing the Inter-Accelerator Connection Lifecycle

During the discovery process, and after it, accelerators (104, 201*a*-201*n*) need to communicate with each other and convey traffic. The accelerator that initiates the connection acts as a handset and initiates a service discovery message to obtain a session ID that is associated with subsequent requests. The expiry semantics for the session ID are the same as with a handset session.

For HTTP requests, just as a handset encodes URLs when it sends it out to the accelerator, the overlay initiator 104 encodes the URLs for the overlay peer 201*a*. The overlay peer 201*a* extracts the origin and connects to it.

For HTTPS requests, on receipt of a VTP request, the overlay initiator 104 issues another VTP request to the overlay peer 201*a*. The VTP mapping at the overlay initiator maps the VTP destination port to the overlay peer's IP address and VTP port. For each data path packet destined to the VTP port at the overlay initiator, the IP address and port are translated to the VTP port allocated by the overlay peer.

5 Estimating Loss Probability with TCP Traffic 5.1 Problem

Since TCP is a reliable transport, the bytes received cannot be used as a mechanism to estimate loss rates. The ACK stream needs to be examined as a hint to detect loss events. In response to duplicate ACKs, TCP may retransmit bytes, but the amount of retransmissions is only a proportional indicator of the loss rates. It does not necessarily give a good estimate of the actual loss rate.

5.2 Solution

Figure 3:
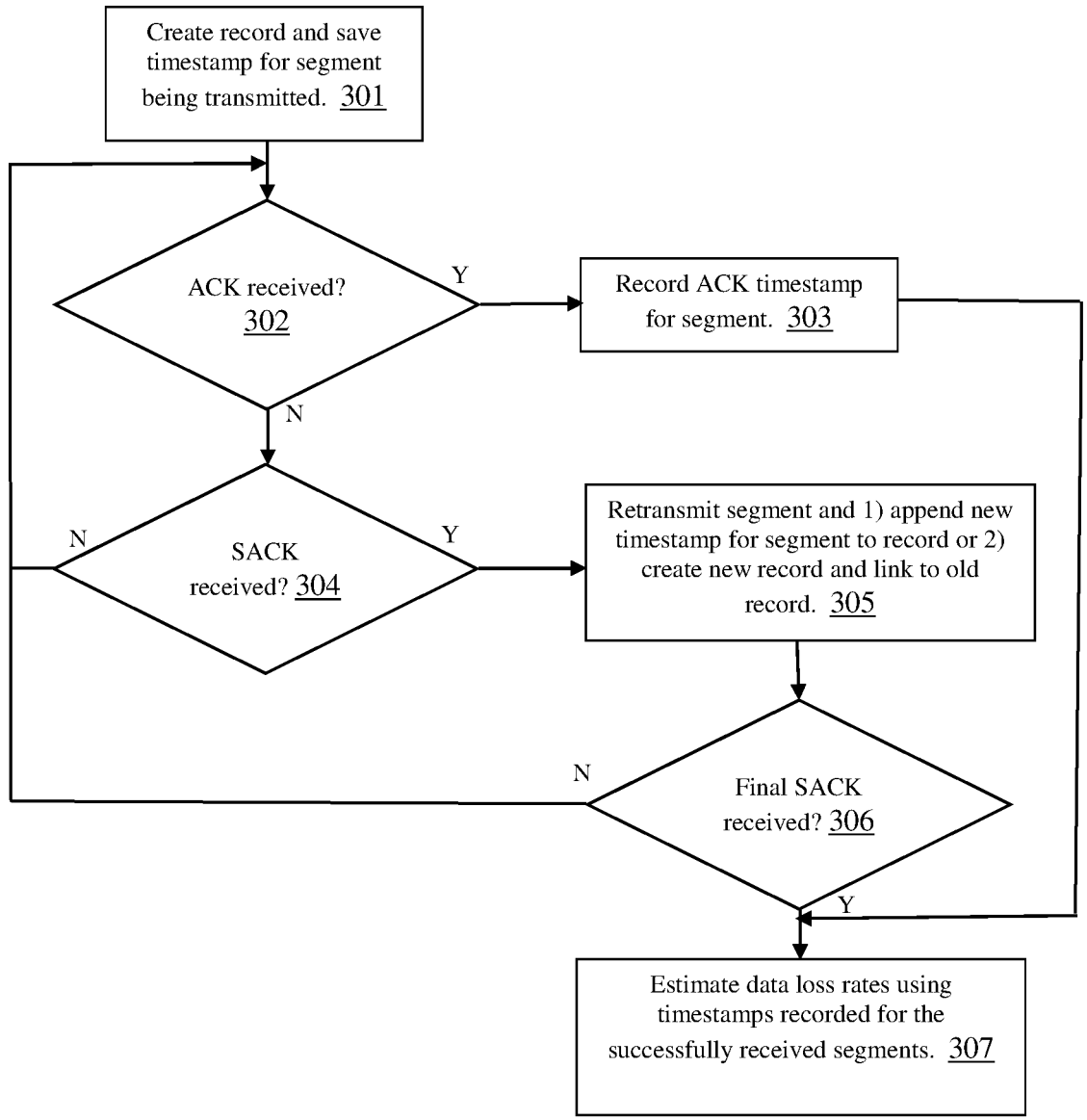
FIG. 3 illustrates a flow chart of an embodiment of the invention.

TCP headers have an optional timestamp field. A receiver echoes the timestamp on the segment received as part of the ACK for that segment. Referring to FIG. 3, in an embodiment, the following set of steps use this timestamp mechanism to calculate an upper-bound on the actual loss rate during a connection's lifetime.

1. The sender records the timestamp corresponding to the range of sequence numbers contained in a segment that is being transmitted 301. The same timestamp is then applied to the TCP option included with the segment.
2. The receiver may or may not have to do any special processing. A standard TCP stack echoes the timestamp on the received segment as part of the ACK packet generated.
3. When there is a loss or reordering in the path going from the sender to the receiver, duplicate ACKs are generated with the appropriate SACK (selective ACK) information indicating which blocks of bytes were actually received.
4. In response to a SACK 304, the sender retransmits a segment and again records the timestamp associated with this sequence number range 305. If the sequence number range is identical to the one recorded in (1), the timestamp is just appended to the record. If it is different, a separate record is created and linked to the record created in (1).
5. At some point, the receiver receives the bytes that were lost. This triggers a SACK informing the sender that the window has to be updated 306.
6. The sender uses the timestamp on this ACK to determine which set of bytes actually made it to the receiver:
   a. The original segment that transmitted, in which case no losses are considered to have occurred 302, 303.
   b. A subsequent retransmission and in this case the number of preceding segments that were retransmitted for this range of sequence numbers.
7. At the end of the connection, the sender sums up the number of segments that were lost as per 6(b) 307. This number is divided by the total number of segments transmitted in the connection to get an estimate of the loss rate.

Reports may be generated by a central administration server, by the sender, by a proxy/accelerator, etc., using the resulting loss rates. In an embodiment, the sender may forward the estimated loss rates or the stored records for the segments to the central administration server. The central administration server may monitor traffic across a plurality of proxy/accelerators or geographic areas and can provide administrators or users with statistical information/reports that can be used to apply traffic management rules to certain areas of the networks. Additionally, or alternatively, estimated loss rates may be used as a feedback mechanism to identify problem pathways between the sender and receiver and/or improve the quality of connection pathways between the sender and receiver.

Embodiments include an apparatus comprising a processor and configured to perform any one of the foregoing methods.

Embodiments include a computer readable storage medium, storing software instructions, which when executed by one or more processors cause performance of any one of the foregoing methods.

Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
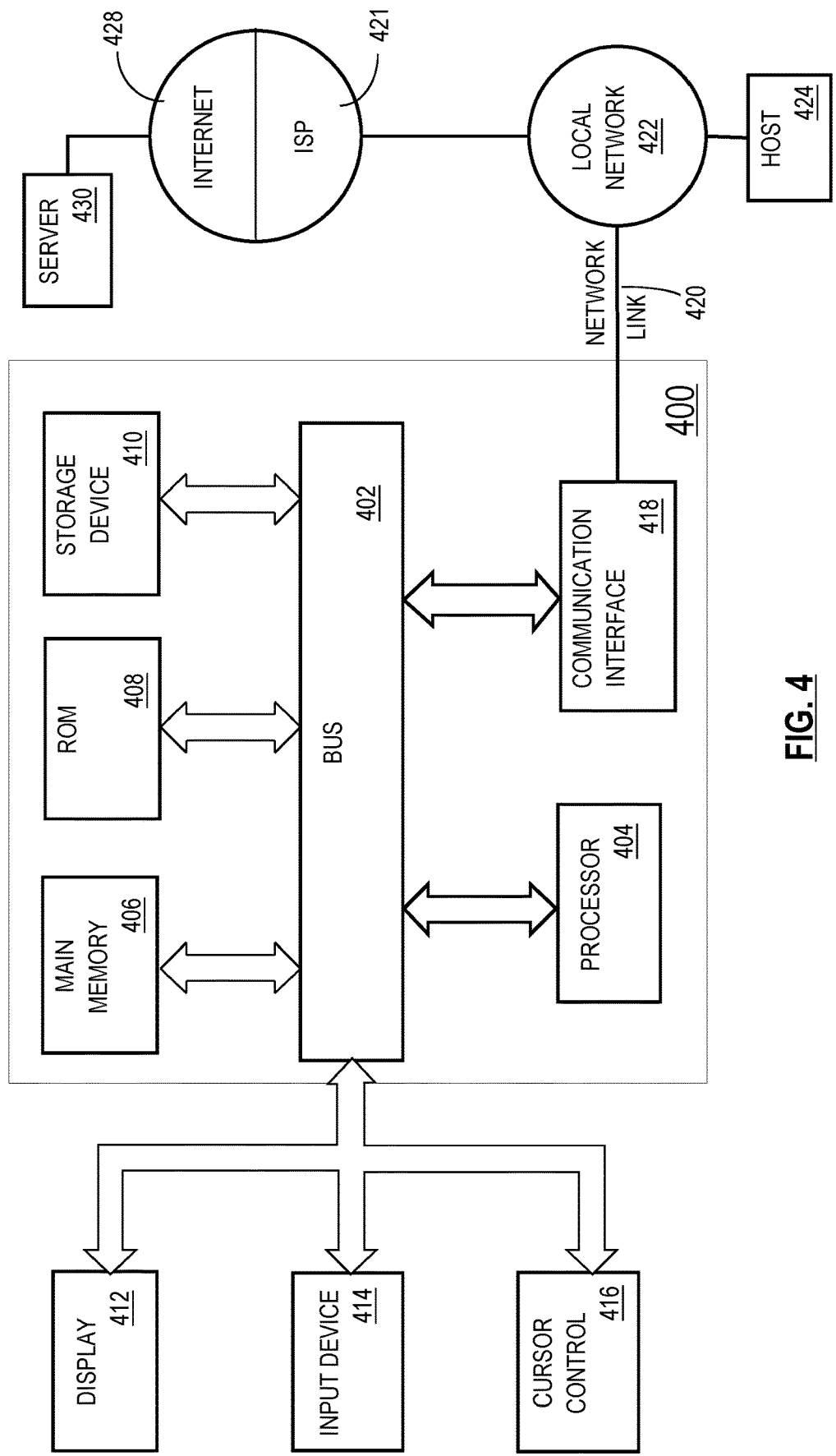
FIG. 4 illustrates an example hardware platform on which a computer or a computing device as described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is device-specific to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using device-specific hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   determining that a first proxy server, among a plurality of proxy servers, is closer than other proxy servers in the plurality of proxy servers to a particular content origin server;
   receiving, by a second proxy server, among the plurality of proxy servers, a request from a user device for content from the particular content origin server, wherein the user device establishes a data connection for the request with the second proxy server via a control channel, the second proxy server is in a geographical area different than the first proxy server;
   establishing, by the first proxy server, a connection with the particular content origin server; and creating a persistent connection between the first proxy server and the second proxy server, wherein communications between the user device and the particular content origin server are routed through the persistent connection, wherein a set of persistent connections that have been created across geographies between proxy servers in the plurality of proxy servers form a dynamic overlay network.

2. The method of claim 1, wherein the first proxy server is selected using a geo-IP mapping of an IP address of the particular content origin server.

3. The method of claim 1, wherein the first proxy server is selected using a latency measurement between the first proxy server and the particular content origin server.

4. The method of claim 1, further comprising:
selecting a peer proxy server among the plurality of proxy servers by using a geo-IP mapping of an IP address of the particular content origin server;
routing the request from the user device to the particular content origin server via a connection between the second proxy server and the peer proxy server;
wherein the determining that the first proxy server is closest to the particular content origin server further comprises:
determining that the first proxy server is closer to the particular content origin server than other proxy servers among the plurality of proxy servers using a latency measurement;
wherein the communications between the user device and the particular content origin server are routed through the persistent connection thereby replacing the connection between the second proxy server and the peer proxy server.

5. The method of claim 1, further comprising:
assigning an expiration time to the persistent connection.

6. The method of claim 1, further comprising:
assigning an expiration time to the persistent connection;
upon reaching the expiration time of the persistent connection, determining whether a third proxy server is closer to the particular content origin server than the first proxy server.

7. The method of claim 1, further comprising:
assigning an expiration time to the persistent connection;
upon reaching the expiration time of the persistent connection, discontinuing the persistent connection between the second proxy server and the first proxy server based on a determination that no outstanding requests exist from the user device to the particular content origin server.

8. The method of claim 1, further comprising:
wherein the second proxy server sends a URL to the first proxy server;
extracting, by the first proxy server, an address of the particular content origin server from the URL, the first proxy server uses the address to establish the connection with the particular content origin server.

9. The method of claim 1, further comprising:
recording, by the second proxy server, a range of sequence numbers contained in each segment of data being transmitted to the first proxy server and a timestamp associated with each segment;
receiving, by the second proxy server, an indication from the first proxy server indicating that a portion of or all of a segment was not received;
recording, by the second proxy server, a timestamp associated with the indication;
retransmitting, by the second proxy server, the portion of or all of the segment that was not received;
upon receiving, by the second proxy server, a subsequent indication that the portion of or all of the segment was received by the first proxy server:
determining, by the second proxy server, a number of segments that were lost using the sequence numbers and recorded timestamps; and
calculating, by the second proxy server, a loss rate using a total number of segments transmitted and the number of segments that were lost.

10. One or more non-transitory computer-readable storage media, storing instructions which, when executed by one or more processors, cause performance of, comprising:
determining that a first proxy server, among a plurality of proxy servers, is closer than other proxy servers in the plurality of proxy servers to a particular content origin server;
receiving, by a second proxy server, among the plurality of proxy servers, a request from a user device for content from the particular content origin server, wherein the user device establishes a data connection for the request with the second proxy server via a control channel, the second proxy server is in a geographical area different than the first proxy server;
establishing, by the first proxy server, a connection with the particular content origin server; and
creating a persistent connection between the first proxy server and the second proxy server, wherein communications between the user device and the particular content origin server are routed through the persistent connection, wherein a set of persistent connections that have been created across geographies between proxy servers in the plurality of proxy servers form a dynamic overlay network.

11. The one or more non-transitory computer-readable storage media of claim 10, wherein the first proxy server is selected using a geo-IP mapping of an IP address of the particular content origin server.

12. The one or more non-transitory computer-readable storage media of claim 10, wherein the first proxy server is selected using a latency measurement between the first proxy server and the particular content origin server.

13. The one or more non-transitory computer-readable storage media of claim 10, wherein the instructions which, when executed by the one or more processors, further cause performance of:
selecting a peer proxy server among the plurality of proxy servers by using a geo-IP mapping of an IP address of the particular content origin server;
routing the request from the user device to the particular content origin server via a connection between the second proxy server and the peer proxy server;
wherein the determining that the first proxy server is closest to the particular content origin server further comprises:
determining that the first proxy server is closer to the particular content origin server than other proxy servers among the plurality of proxy servers using a latency measurement;
wherein the communications between the user device and the particular content origin server are routed through the persistent connection thereby replacing the connection between the second proxy server and the peer proxy server.

14. The one or more non-transitory computer-readable storage media of claim 10, wherein the instructions which, when executed by the one or more processors, further cause performance of:

assigning an expiration time to the persistent connection.

15. The one or more non-transitory computer-readable storage media of claim 10, wherein the instructions which, when executed by the one or more processors, further cause performance of:

assigning an expiration time to the persistent connection;

upon reaching the expiration time of the persistent connection, determining whether a third proxy server is closer to the particular content origin server than the first proxy server.

16. A system, comprising:

a first proxy server among a plurality of proxy servers;

a second proxy server among the plurality of proxy servers;

a proxy server locator, implemented at least partially in hardware, configured to determine that a first proxy server is closer than other proxy servers in the plurality of proxy servers to a particular content origin server;

a communications device at the second proxy server configured to receive a request from a user device for content from the particular content origin server, wherein the user device establishes a data connection for the request with the second proxy server via a control channel, the second proxy server is in a geographical area different than the first proxy server;

a communications device at the first proxy server configured to establish a connection with the particular content origin server; and wherein the communications device at the first proxy server creates a persistent connection between the first proxy server and the second proxy server, wherein communications between the user device and the particular content origin server are routed through the persistent connection, wherein a set of persistent connections that have been created across geographies between proxy servers in the plurality of proxy servers form a dynamic overlay network.

17. The system of claim 16, wherein the first proxy server is selected using a geo-IP mapping of an IP address of the particular content origin server.

18. The system of claim 16, wherein the first proxy server is selected using a latency measurement between the first proxy server and the particular content origin server.

19. The system of claim 16, wherein the communications device at the first proxy server assigns an expiration time to the persistent connection.

20. The system of claim 16, wherein the communications device at the first proxy server assigns an expiration time to the persistent connection, and wherein upon reaching the expiration time of the persistent connection, the proxy server location device determines whether a third proxy server is closer to the particular content origin server than the first proxy server.

* * * * *